Jan. 17, 1967 A. H. BERGSTEN 3,298,459

TREE CLIMBING APPARATUS

Filed Dec. 16, 1964

INVENTOR.
ARVID H. BERGSTEN
BY Schroeder, Siegfried & Ryan
ATTORNEYS

United States Patent Office 3,298,459

Patented Jan. 17, 1967

3,298,459

TREE CLIMBING APPARATUS

Arvid H. Bergsten, 759 W. Main St., Anoka, Minn. 55303

Filed Dec. 16, 1964, Ser. No. 418,815
5 Claims. (Cl. 182—92)

This invention relates to apparatus for facilitating the climbing of trees and more particularly to tree climbing steps of the removable type particularly adapted for the use by sportsmen.

Tree and pole climbing apparatus have previously been employed in varying fields of activity. In connection with pole climbing in telephone and electrical transmission work, fixed steps or rungs placed in the poles at the time of installation and special pole climbing gear worn by the climber have been previously used to facilitate climbing of poles for various working functions. The same type of gear is also employed by tree trimmers in the climbing of trees.

On the part of sportsmen, there has been an increased interest in the use of hunting locations or stands above the ground level, particularly in the hunting of animals, such as deer. Inasmuch as hunting of this type is done in remote and wooded areas, pre-built hunting stands are not feasible. This has given rise to a practice of hunters utilizing perches in trees as hunting stands and the increased practice in tree climbing to reach such stands. While such elevated stands or hunting locations provide positions of safety on the part of the hunter with respect to the normal line of fire of the guns used by hunters, it has presented a hazard to the safety of a hunter in reaching such perches. Conventional climbing apparatus is too specialized and is too bulky for the hunter to carry to such locations. With the present invention, hunters are hereby provided with removable steps which may be positioned in a tree trunk to facilitate the climbing of trees for this purpose. Thus a plurality of such step members may be readily utilized by the hunter in establishing and reaching a perch of safety and requires a minimum amount of effort on the part of the hunter or tree climber to install. Further, the improved step member is relatively light in weight and a plurality of such step members may be readily carried by a hunter into such hunting locations without adding an undue burden to his hunting gear. The improved step member is removable such that it may be readily installed for temporary usage and removed by the user so as not to permanently damage the tree. In this manner the removable step members become a part of the hunter gear for this purpose and may be reused indefinitely. The improved removable step includes a portion readily adapted to be positioned into a trunk of a tree through a conventional threading process and the shape of the step provides a crank with a suitable lever arm to facilitate positioning the step member in a tree to a depth where it will support the weight of the climber, provide a safe and adequate stepping arrangement to simplify tree climbing, and eliminate the hazards of falling.

Therefore it is an object of this invention to provide an improved apparatus for facilitating the climbing of trees.

Another object of this invention is to provide a removable step member which is a rigid structure capable of supporting the weight of a climber and which may be readily and simply installed.

A further object of this invention is to provide a tree climbing apparatus which is simple in design and structure, low in cost and may be readily installed by the climber during a climbing operation.

A still further object of this invention is to provide aid for sportsmen in a tree climbing function to increase the safety of the same.

These and other objects of this invention will become apparent from a reading of the attached description together with the drawings wherein.

Figure 1:
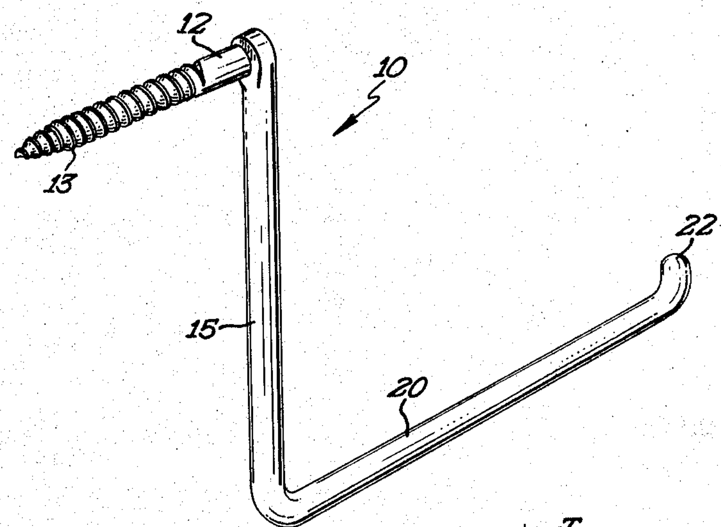
FIGURE 1 is a perspective view of the improved removable step member.
Figure 2:
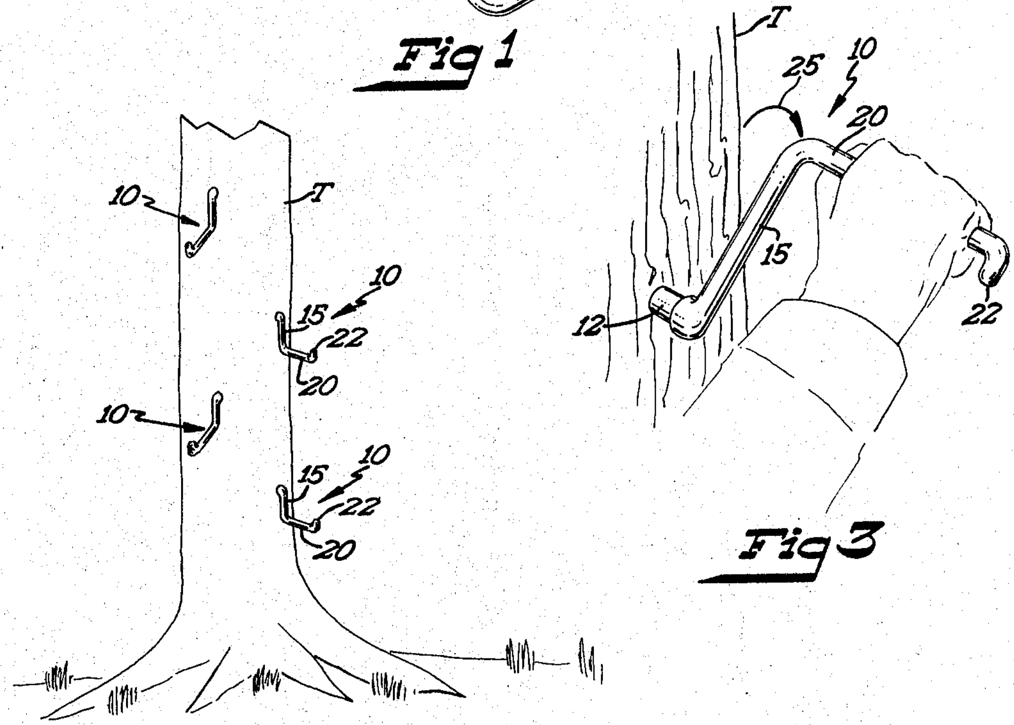
FIGURE 2 is a schematic view of a tree with a plurality of the removable step members positioned therein.

As shown herein, the removable step members are applied to the trunk of the tree T to explain the preferred usage of the same. It will be understood, however, that such structure may be employed in wooded poles, if desired. The improved removable step, indicated generally at 10, in FIGURE 1 is a rigid member preferably of metallic construction and includes a tapered shaft extremity 12 having a threaded surface 13 of a conventional wood screw type. The main body of the rigid step member includes a crank portion 15 which is connected to the extremity of the shaft through suitable means such as welding and a step portion 20 which is normally formed by bending the rigid member along its extent and normal to the crank portion such that the step portion projects in a direction opposite the extent of the shaft which is similarly located normal to the extent of the crank portion. The extremity of the step portion has a turned up flange 22 which operates as a shoe retainer to prevent a foot of the climber from sliding off the step member. The body of the step member may be made of a suitable metallic rod which will not bend under weight of the climber. The removable step member is adapted to be used through the process of threading the shaft portion 12 into the trunk of a tree T utilizing the crank portion for mechanical leverage and through manual manipulation by gripping the step portion 20 for rotating the same.

Figure 3:
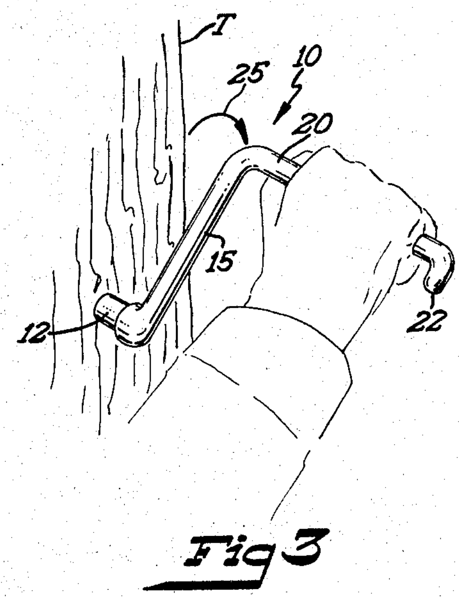
FIGURE 3 is a diagrammatic view showing the installation of the improved removable step member.

In normal usage, the removable step members are applied to the trunk of a tree T by a sportsman or hunter through a process of installation at ground level and to a level as high as the climber or hunter can reach from the ground. Thus the hunter will normally leave his gear on the ground and insert a plurality of the steps in a staggered relation as shown in FIGURE 3 with the step portions facing in diverging or opposite directions to facilitate climbing of the tree. Several, preferably three, such step members are inserted into the tree by holding the threaded shaft against the trunk and rotating the handle portion or the crank portion manually by gripping the step in an arcuate motion until the threaded extremity 13 advances into the trunk of the tree and is securely positioned therein with the crank portion being disposed adjacent the surface of the tree (see FIGURE 3). In the normal climbing position, the crank portion will be positioned vertical and the step portion will be at the lowest point on the arc of threaded movement so that the step member will not turn when weight is applied thereto. Further the shaft will be advanced into the surface of the tree trunk such that the crank portion will be disposed adjacent the same so as that it will aid in supporting the weight of the climber. The flange 22 at the extremity of the step member prevents sliding of the foot of the climber from the step surface to insure safety in climbing. After several such steps have been positioned in the trunk of the tree in a staggered relationship, the climber will add further step members with a similar process by positioning himself on the steps previously installed so as to advance up the trunk of the tree to a desired location or stand for hunting purposes. The individual removable step members are readily inserted in the trunk of the tree in a conventional threading manner and the individual steps will support the weight of the hunter or climber during such process and while providing hand grips to aid the climbing operation. After a plurality of such steps are installed in a tree trunk to a level desired by the climber, he may return to the ground and collect his remaining hunting gear for positioning himself on the stand. This improved tree climbing apparatus for sportsmen enables the sportsmen to reach a lofty perch above the ground without danger of falling from the climbing operation and will facilitate reaching such hunting stands.

In FIGURE 3, the arrow 25 indicates a direction of rotation of the crank in the threading operation, it being understood that any type of thread pitch and direction may be applied thereto. Upon completion of a hunting, the hunter or sportsman may return to the ground level with his gear and then retracing his steps remove the step members so that they may be used again for the same purpose. In this manner the metallic inserted portion will not be left in the trunk of the tree to effect the growth of the same.

This improved removable step member provides an improved tree climbing apparatus readily adaptable for sportsmen which are considerably less bulky than conventional tree climbing apparatus and presents less weight for the sportsman. Their usage permits safety in tree climbing to enable the hunter to use elevated stands in hunting. The simplicity in design and the ease in usage make such apparatus available to all hunters. The actual dimensions of the crank and step portions may be varied within the scope of the present invention, it being understood that the crank portion will provide sufficient mechanical leverage to thread the shaft into the trunk of the tree with minimum amount of effort. Further the dimension of the step will be sufficient to accommodate the foot of the climber and the length of the shaft and the weight or cross-section of the metallic material involved shall be sufficient to support the weight of the climber.

In considering this invention it should be remembered that variations may be made in the shape of the removable step as outlined above and in the materials employed in the same. I wish therefore to be limited in the invention only by the appended claims.

What is claimed is:

1. Apparatus for climbing comprising, in combination, a surface to be climbed, a plurality of removable step members connected in a staggered vertical relationship to the surface, each of the removable step members being characterized by the shaft portion having a screw thread formed thereon, a crank portion connected to the shaft portion and extending downwardly and normally thereto, and a step portion defined by bending the lower end of the crank portion and extending normal thereto and in a direction opposite to that of the shaft portion, the step portion forming a handle for the crank portion and serving as a step, the shaft portion being threaded into the surface such that the crank portion contacts the surface along its extent and aids in the support of the step member on the surface.

2. The removable step member of claim 1 in which each step member is made of a metallic material and the threaded shank, crank and step portions are formed integral with one another.

3. The removable step member of claim 2 in which the step portion and crank portion are approximately the same length and at least twice the length of the threaded shaft portion.

4. The removable step member of claim 3 and including foot retaining means at the extremity of the step portion opposite to the crank portion which foot retaining means is formed by a bend at the extremity of the step portion opposite to the crank portion and in the direction of the extent of the crank portion.

5. A removable step for climbing comprising in combination, a surface to be climbed and adapted to have the removable step member positioned thereon, a removable step embedded into the surface, said removable step being characterized by a rigid body portion having a tapered shaft at one extremity, means on the surface of the shaft for embedding the shaft into the surface through rotation of the shaft the rigid body member extending from the shaft in a direction normal thereto and being bent intermediate along its extent to define a crank portion connected to the shaft and a step portion normal thereto and extending in a direction opposite to the shaft, and a shoe retaining portion positioned at the end of the step portion, the step portion functioning as a handle to rotate the shaft through the crank portion inserting the shaft into the surface such that the crank portion contacts the surface along its extent and is positioned in vertical alignment with the shaft and crank portion to aid in the support of the step member.

References Cited by the Examiner

UNITED STATES PATENTS

| | | | |
|---|---|---|---|
| 387,436 | 8/1888 | O'Neil | 182—100 |
| 907,483 | 12/1908 | Ette | 182—90 |
| 963,066 | 7/1910 | Pringle | 248—217 |

FOREIGN PATENTS

| | | |
|---|---|---|
| 130,467 | 12/1948 | Australia. |
| 12,196 | 5/1906 | Great Britain. |

REINALDO P. MACHADO, *Primary Examiner.*